United States Patent [19]

Pucci

[11] Patent Number: 5,356,990

[45] Date of Patent: Oct. 18, 1994

[54] BLENDS OF IMMISCIBLE POLYMERS HAVING NOVEL PHASE MORPHOLOGIES

[75] Inventor: Mark S. Pucci, Elk Grove Village, Ill.

[73] Assignee: Morton International, Inc., Chicago, Ill.

[21] Appl. No.: 709,667

[22] Filed: May 31, 1991

[51] Int. Cl.$^5$ .................. C08L 51/06; C08L 29/04; C08L 23/06

[52] U.S. Cl. ........................ 525/57; 525/78; 525/79

[58] Field of Search ............... 525/57, 78, 79; 264/331.7

[56] References Cited

U.S. PATENT DOCUMENTS

| | | | |
|---|---|---|---|
| 3,975,463 | 8/1976 | Hirata et al. | 525/57 |
| 4,410,482 | 10/1983 | Subramanian | 428/35.7 |
| 4,971,864 | 11/1990 | McCord | 428/516 |

FOREIGN PATENT DOCUMENTS

| | | |
|---|---|---|
| 0152180 | 8/1985 | European Pat. Off. |
| WO88/02764 | 3/1988 | PCT Int'l Appl. |
| 9105008 | 4/1991 | PCT Int'l Appl. |

OTHER PUBLICATIONS

European Search Report, 22 Oct. 1992.

*Primary Examiner*—John Kight, III
*Assistant Examiner*—Jeffrey Culpeper Mullis
*Attorney, Agent, or Firm*—Wayne E. Nacker; Gerald K. White

[57] ABSTRACT

Unique phase morphologies of incompatible thermoplastic polymers, including a higher melting temperature polymer and a lower melting temperature polymer that has been sufficiently chemically compatibilized to form a stable interface in a two-phase system, are achieved by pre-melting the higher melting temperature polymer, adding the compatibilized lower melting temperature polymer in solid form thereto, and thereafter melting the lower temperature polymer with mixing. In particular, in poly(ethylene vinyl alcohol)/modified polyolefin systems, compositions containing between about 35 and about 55 wt. percent EVOH are formed in which the poly(ethylene vinyl alcohol) exists as a continuous phase and the modified polyolefin exists as discrete domains dispersed therein. Such blended compositions have gas barrier properties comparable to homogeneous poly(ethylene vinyl alcohol).

7 Claims, No Drawings

BLENDS OF IMMISCIBLE POLYMERS HAVING NOVEL PHASE MORPHOLOGIES

The present invention is directed to blends of immiscible thermoplastic polymers and more particularly to producing blends of immiscible thermoplastic polymers with novel phase morphologies.

BACKGROUND OF THE INVENTION

It can be desirable to produce solid blends of two immiscible thermoplastic polymers, i.e., polymers which do not mix so as to form a homogeneous composition, but which are sufficiently compatible so as to form a generally uniform composition in which each of the polymers exists in distinct domains of the solid composition. To achieve the compatibility of the two polymers that allows them to interface without complete phase separation, it is often necessary to chemically compatibilize the polymers, for example, by grafting compatibilizing chemical moieties to one of the thermoplastic polymers.

The properties of a blended composition of two immiscible polymers is not only a function of the natures of the two polymers and their relative proportions, but also of the phase morphology of the composition, e.g., whether one polymer or the other forms a continuous phase or the sizes of the domains of the immiscible polymers. Applicants have found that the phase morphology may be altered, depending upon how the two immiscible polymers are mixed together and have found that novel phase morphologies can be obtained by varying the normal order of mixing the two polymers. In some cases, it has been found that by using a particular mixing procedure, a particularly desirable blend can be achieved at certain proportions of the two immiscible polymers in which one of the polymers forms a continuous phase with the other polymer existing as distinct, dispersed domains therein.

A particular problem addressed by Applicants was to provide a relatively low-cost gas barrier layer based upon ethylene vinyl alcohol (EVOH). By EVOH is meant, herein, a copolymer of ethylene (between about 20 and about 50 mole percent) and a vinyl ester, e.g., vinyl acetate (between about 50 and about 80 mole percent) which has been substantially saponified (at least about 90 percent) subsequent to polymerization. EVOH exhibits excellent gas barrier properties and is therefore particularly desirable as a gas barrier layer in a multi-layer laminate for forming containers for food. EVOH, however, is a relatively expensive polymer. Manufacturing constraints often demand a layer of a certain thickness, thereby requiring a certain total amount of material in such a layer. It has therefore been proposed that EVOH be blended with less expensive thermoplastic polymers, such as polyolefins; such blends are taught, for example, in U.S. Pat. No. 3,975,463 to Hirata et al., the teachings of which are incorporated herein by reference. U.S. Pat. No. 4,971,864, the teachings of which are incorporated herein by reference, addresses the relatively poor gas barrier provided by EVOH/polyolefin blends, relative to homogeneous EVOH. As the continuous phase of such blends is normally the polyolefin, gas may seep through the polyolefin and around the EVOH domains. The problem is addressed in the U.S. Pat. No. 4,971,864 by extruding in such a manner that in an extruded layer of the blend, there exist overlapping EVOH domains that require that gas travel a tortuous pathway through the layer. However, because the continuous phase is still the polyolefin, a less-than-complete gas barrier is formed.

There exists the need for EVOH/polyolefin blends having better gas barrier properties.

The present invention is directed to producing blends of immiscible polymers with particular phase morphologies. Of interest are blends of two immiscible polymers in which a desired one of the polymers forms a continuous phase with the other polymer existing as dispersed domains therein. Of particular interest are blends of EVOH and a polyolefin, that is modified so as to be able to blend with the EVOH as a two-phase polymer composition in which the EVOH forms a continuous phase containing dispersed discrete domains of the polyolefin.

SUMMARY OF THE INVENTION

In accordance with the invention it has been found that unique phase morphologies of a blend of immiscible polymers can be obtained by controlling mixing and melting procedures. In particular, it is found that where one of the thermoplastic polymers has a relatively low melting temperature and the other polymer has a relatively high melting temperature, unique phase morphologies may be achieved by pre-melting the high melting temperature polymer and adding the low melting temperature polymer in a solid form to the pre-melted high melting temperature polymer and mixing the low melting temperature polymer into the high melting temperature polymer as the low melting temperature polymer melts. In some cases, a blend having a continuous phase of the high melting temperature polymer containing dispersed domains of the compatibilized low temperature polymer can be achieved at relative proportions of the two polymers which has not been heretofore achieved. Of particular interest are blends of EVOH and modified polyolefin prepared by pre-melting the EVOH and adding the modified polyolefin in solid form to the pre-melted EVOH.

In cases where EVOH comprises between about 35 and about 55 wt. percent of the blend and the compatibilized polyolefin comprises between about 65 and about 45 wt. percent of the blend, novel blends are achieved wherein EVOH provides a continuous phase containing dispersed domains of the modified polyolefin.

DETAILED DESCRIPTION OF CERTAIN PREFERRED EMBODIMENTS

The invention is directed to blends of immiscible polymers. Two polymers are generally immiscible with each other because they differ substantially in polarity. Thus, EVOH/polyolefin, polyacrylamide (nylon)-/polyolefin and polyester/polyolefin, e.g., polyethylene terephthalate/polyolefin, systems are examples of two-component immiscible polymer blends. The term "polyolefin" is used broadly herein to include such polyolefins as polyethylene, polypropylene, polybutene/poly-4-methyl-1-pentene, as well as olefin copolymers and mixtures of polyolefins. Of particular interest are polyethylenes, including high density polyethylenes (having densities between about 0.940 and about 0.970), low density polyethylenes (having densities between about 0.915 and about 0.940) and very low density polyethylenes (having densities below about 0.915).

When two polymers are inherently immiscible, in order to form a blend of the two polymers that is generally uniform and without gross separation into two phases, it is generally necessary to chemically compatibilize the polymers so as to allow them to interface. The compatibilization may be through the use of an external surfactant. However, of most interest, herein, are systems in which one of the polymers, particularly the lower melting temperature polymer, is internally chemically modified so as to provide a stable surface interface with the other polymer. One way of compatibilizing polyolefins with more polar polymers, such as EVOH or nylon, is to modify the polyolefin to give the polyolefin carboxylic acid (or carboxylic acid anhydride) functionality. For example, an unsaturated acid or unsaturated acid anhydride, such as maleic acid or maleic acid anhydride, may be graft polymerized to the polyolefin. Such compatibilization is discussed in the above-referenced U.S. Pat. Nos. 3,975,463 and 4,971,864. The acid or anhydride may be grafted to the entire mass of the polyolefin to achieve the necessary acid functionality. More often; however, a minor portion of the polyolefin is functionalized or modified by grafting. It is preferred that this minor portion of modified polyolefin is intimately admixed, e.g., by melt-blending, with a major portion of unmodified polyolefin prior to admixing the polyolefin with the more polar polymer. Adding modified and unmodified polyolefin contemporaneously to the molten polar polymer is, however, not ruled out. The amount of acid or anhydride grafted to the polyolefin to provide compatibility with the EVOH is between about 0.05 wt. % to about 10 wt. % relative to the weight of the entire amount of polyolefin (including modified and unmodified polyolefin) in the two-phase composition. Most commonly, the acid or anhydride is used at a level of between about 0.1 and about 8 wt. percent relative to the total weight of the polyolefin in the two-phase composition. Hereinafter, unless stated otherwise, the term "modified" polyolefin will be used to refer to the entire amount of polyolefin in the two-phase system, regardless of whether the polyolefin is a homogeneously modified polyolefin or whether the polyolefin is a mixture of modified and unmodified polyolefin.

The invention relates primarily to blends of two thermoplastic polymers, as the method of the invention requires that at some point, both polymers are in molten form. However, it is also considered to be within the scope of the invention that one or both of the polymers be thermosetting during a time frame considerably longer than the melt-processing, so that the thermosetting polymer(s) acts during processing as a thermoplastic polymer.

The invention is directed primarily to two-polymer systems in which the two polymers are incompatible. However, unique phase morphologies may also be achieved in multi-polymer systems in which at least one polymer is immiscible with another polymer so that at least two separate polymer phases are present in the final, solidified composition.

The findings of the present invention suggest that phase morphologies of currently-produced blends of immiscible polymers is due, to a significant degree, to the manner in which thermoplastic polymers are commonly blended.

Although applicants discuss their theories herein, they are not bound by any particular theory, and the surprising and unexpected results achieved by the invention was not predicated by reliance on any known theory. Commonly, two immiscible polymers are blended in solid form, e.g., pellets, and are co-melt-blended together to form a composition. If there is any significant difference in melting temperatures, the lower melting temperature polymer will melt first. As more thermal energy is added, the higher melting temperature polymer melts into the molten lower melting temperature polymer. The extent that the lower melting temperature polymer melts ahead of the higher melting temperature polymer depends, of course, upon the differences in melting temperatures between the two polymers, but when there is a very substantial difference in the melting temperatures of the polymers, e.g., about 30° C., or more, it is believed that most of the lower melting temperature polymer is molten before any significant amount of the higher melting temperature polymer melts. As the higher melting temperature polymer melts, it is adding in incremental amounts to the pre-melted pool of lower melting temperature polymer. It is believed that when this occurs, the system is biased to dispersing the higher melting temperature polymer, at least initially, in a continuous phase of a lower melting temperature polymer.

The phase morphology which results from co-melt-blending two immiscible polymers, starting with all solid materials, may not be the equilibrium phase morphology, i.e., that morphology which would eventually result if the two polymers were mixed in molten condition for an extended period of time. However, the phase morphology which results from initial melt-blending may be "frozen" should the melt-blend be cooled soon after forming. This is the case when EVOH and modified polyolefin are introduced into an extruder as pellets and then extruded.

The likelihood of the initially-formed phase morphology becoming "frozen" is probably enhanced if chemical mechanisms exist for otherwise stabilizing that phase morphology, at least temporarily. In the case of blending two immiscible polymers in which means are provided to interface the two polymers, the phase morphology which initially forms is likely to be stabilized, at least temporarily. In the case of blending EVOH with modified polyolefin, that mechanism is probably available due to the surface interaction between the acid or anhydride groups of the modified polyolefin and the hydroxyl groups of the EVOH. In this particular system, there is, in fact, evidence of actual chemical reaction, i.e., esterification reaction, between the graft polyolefin and the EVOH.

Thus, in an EVOH/modified polyolefin system, co-melt-blended in the common manner, there tends to be a strong bias toward forming and "freezing" a dispersion of EVOH in a continuous phase of polyolefin. For example, when forming a 50/50 wt. percent blend of EVOH and modified polyolefin, the prior art has consistantly produced dispersions of EVOH domains within a continuous phase of compatibilized polyolefin. The gas barrier properties of film layers made of such blends are inherently much poorer than the gas barrier properties of a homogeneous EVOH film layer, because gases will find their way through the polyolefin domains. Even when a somewhat tortuous gas transmission pathway is provided, such as in the compositions extruded in the manner of above-referenced U.S. Pat. No. 4,971,864, the gas barrier properties of a homogeneous film of EVOH is not approached by the blend.

Applicants have found that by pre-melting the higher melting temperature polymer and adding the lower melting temperature polymer, in solid form, to this pre-melted higher temperature polymer and melting the lower temperature polymer with mixing, novel phase morphologies are achieved in some polymer systems, particularly the EVOH/modified polyolefin systems of particular interest. In this case, the system appears to be biased toward producing dispersions of the modified polyolefin in a continuous phase of EVOH. It may well be that in cases where the surface active moieties are inherently part of the lower melting temperature polymer, as is the case with the grafted carboxyl and/or acid anhydride moieties of the modified polyolefin utilized in the present invention, there is a particular bias toward dispersing the lower melting temperature polymer in the higher melting temperature polymer, provided that the higher melting temperature polymer is pre-melted. The same surface reactions or interactions which tend to "freeze" the phase morphology when two polymers are co-melted-blend, also act to "freeze" the different phase morphology when the lower melting temperature polymer is added, by incremental melting, to a pre-melt of the higher melting temperature polymer.

One factor that determines the final phase morphology of a two-immiscible polymer system remains the relative amounts of these two immiscible polymers. At the ends of the spectrum, where one or the other polymer comprises a very major amount of total polymer, a dispersion of the minor polymer within a continuous phase of the major polymer will result. It is also to be appreciated by those skilled in the art that any theory discussed herein is probably oversimplified, and that factors such as relative viscosities of the polymers, the degree of surface interactive chemical moieties or agents, the relative polarities of the immiscible polymers, the length of mixing time, etc., will also affect the phase morphology of the final solidified composition.

In systems in which a modified lower melting temperature polymer is blended with a higher melting temperature polymer, particularly an EVOH/modified polyolefin system, there are found to be phase morphology advantages throughout a good portion of the proportion spectrum, achieved by pre-melting the higher melting temperature polymer and adding the lower melting modified polymer in solid form to the pre-melted higher melting temperature polymer.

In the ordinary, co-melt-blending method (starting with two solid resins) of preparing EVOH/compatibilized polyolefin blends, there is a strong bias to produce a continuous phase of the compatibilized polyolefin containing distinct domains of dispersed EVOH. In fact, even up to about 50–55 wt percent EVOH, the polyolefin tends to form a continuous phase. The phase morphology can be visibly demonstrated by staining a film of the polymer with iodine which reacts with the —OH groups of EVOH, staining the EVOH domains blue against a clear background. (In this discussion, it should be noted that exact relative percentages where different phase morphologies occur are probably a function of the particular EVOH, polyolefin and grafted polyolefin utilized, although the trends discussed are true of this type of system in general). At higher levels of EVOH, e.g., between about 50–60 wt. percent, the phase morphology tends to be co-continuous, that is, domains of EVOH are intermeshed with domains of polyolefin. Film layers in which polyolefin is a continuous phase or films in which EVOH and polyolefin domains are co-continuous are inefficient gas barriers relative to homogeneous EVOH film layers, as gas may travel through the polyolefin domains.

It is not until the EVOH percentage is upward of about 60 wt. percent that the phase morphology becomes a continuous EVOH phase, containing dispersed domains of polyolefin. Even when high levels of EVOH and low levels of polyolefin are used in a co-melt-blending process to produce a continuous phase of EVOH, the polyolefin domains may tend to be relatively large. This is disadvantageous, particularly in thin film layers, as any sufficiently large polyolefin domain may extend through the film and provide a gas-transport pathway.

By pre-melting the EVOH and adding the polyolefin as a solid thereto, and thereafter melting the pololefin with mixing, dramatic changes in phase morphologies are seen at corresponding weight percentages of EVOH and compatibilized polyolefin. For example, at about 25–35 wt % EVOH, EVOH now tends to form co-continuous domains with the polyolefin. While such a composition forms an incomplete gas barrier, it is improved relative to a continuous polyolefin phase morphology. Of most interest, beginning at about 35 wt. % EVOH, a phase morphology comprising a continuous phase of EVOH containing dispersed domains of compatibilized polyolefin is produced. In terms of commercial utility, the range of 35 to 55 wt % EVOH/65 to 45 wt % compatibilized polyolefin is of significant interest, and it is believed that compositions with EVOH as the continuous phase containing dispersed domains of polyolefin have not been heretofore produced in this relative proportion range. That EVOH is the continuous phase can again be demonstrated by iodine staining; clear dispersed domains (polyolefin) are seen against a blue background (EVOH). Of importance is that with EVOH as the continuous phase, film layers formed of the composition exhibit gas barrier properties approaching those homogeneous EVOH film layers of comparable thickness. The gas barrier properties of film layers with EVOH as the continuous phase are tremendously improved relative to the gas barrier properties of film layers with polyolefin as the continuous phase.

Even at higher percentages of EVOH, where due to the high level of EVOH relative to polyolefin, a continuous EVOH phase may result from a common co-melt-blending process, advantages may still realized by using the method of the present invention. In particular, the dispersed polyolefin domains tend to be much smaller than those produced from the usual co-melt-blending process, making it less likely that polyolefin domains will extend through a thin film layer of the composition.

Although the advantages of the present invention have been most thoroughly demonstrated with respect to an EVOH/polyolefin system, similar differences with respect to phase morphology should result when the higher-melting polymer is pre-melted and the lower-melting polymer is added initially as a solid thereto, particularly when the lower-melting polymer contains integral compatibilizing chemical moieties, such as the carboxylic acid and carboxylic acid anhydride moieties of the graft polyolefins used in the present invention. In this respect, of particular interest are nylon (polyamide)/polyolefin systems and polyester/polyolefin systems.

In practicing the process of the present invention, it is important to maintain a uniform addition of the lower-melting polymer. One means of accomplishing this is to pre-melt the higher-melting polymer in an extruder and add the lower-melting polymer downstream in pellet form at a downstream inlet port using a gravimetric feeder, for example, a Brabender® gravimetric feeder. After extrusion, the extruded blend is cooled in a conventional manner to solidify the compositions and to make permanent the unique phase morphologies provided by the method of the present invention.

A surprising and unexpected result is that the polyolefin, in the reverse-phase EVOH/polyolefin blends prepared in accordance with the present invention, actually improves mechanical characteristics relative homogeneous EVOH. The original intent of blending the polyolefin with the EVOH was to reduce the cost of the gas barrier material. That the mechanical characteristics are improved is a surprising, beneficial result. In particular, the flex-crack properties of the blend are significantly improved relative to homogeneous EVOH.

The invention will now be described by way of specific examples.

EXAMPLES

MATERIALS

EVOH samples used in Examples 1–5 are described in Table 1. EVOH-A is a commercial EVOH known as Soarnol® D2908 (Nippon Synthetic Chemical Company). EVOH-B is a commercial EVOH known as Soarnol® DC3202 (also Nippon Synthetic Chemical Company).

Polyolefin samples used in examples 1–5 are described in Table 1. These polyolefins were produced by melt blending the two components listed in a single screw extruder. The VLDPE (very low density polyethylene) described is a commercial polyethylene known as Athene® 4003 (Dow Chemical Company). The maleic anhydride modified polyolefin is a 4-melt index high density polyethylene containing about 2 wt. percent maleic anhydride. The HDPE (high density polyethylene) listed in Table 1 is a commercial resin known as Gulf® 9634 (Chevron Chemical Company).

TABLE 1

| EVOH DESIGNATION | TYPE |
| --- | --- |
| EVOH-A | 29 Mole percent ethylene 8 Melt flow index |
| EVOH-B | 32 Mole percent ethylene 3.2 Melt flow index* |
| POLYOLEFIN DESIGN | |

TABLE 1-continued

| | TYPE |
| --- | --- |
| PO-A | 80% VLDPE (0.90 Density, 0.85 Melt index**) 20% Maleic anhydride modified polyolefin |
| PO-B | 75% VLDPE (0.90 Density, 0.85 Melt index**) 25% Maleic anhydride modified polyolefin |
| PO-C | 75% HDPE (0.960 Density, 0.9 Melt index**) 25% Maleic anhydride modified polyolefin |

*210° C., 2160 gms.
**190° C., 2160 gms.

EXAMPLE 1

105 grams of EVOH and 105 grams of polyolefin (50/50 EVOH to polyolefin ratio) were simultaneously charged into a laboratory plasticating mixer (Brabender® Plasticorder), preheated to 230° C., operating at a blade rotation speed of 80 RPM. Once the mixture equilibrated to 230° C., an additional 5-minute mix time was imposed. At the completion of mixing, the mixture was removed from the Plasticorder and cooled at room temperature. A small sample of the mixture was then microtomed, stained with iodine (to dye the EVOH portion), and observed under an optical microscope for phase morphology.

An "EVOH premelt" blend was then prepared by initially charging only the 105 grams of EVOH to the plasticating mixer. Once the EVOH had melted and equilibrated to 230° C., the 105 grams of polyolefin was added over a 3-minute period. Once addition was completed, a 5-minute mix time was imposed.

After completion of mixing, the mixture was prepared for optical microscopy as described above.

Table 2 gives results for the EVOH/polyolefin blends prepared by these two methods.

TABLE 2

| EVOH | POLYOLEFIN | BLEND METHOD | MATRIX | DISPERSION WITHIN MATRIX |
| --- | --- | --- | --- | --- |
| EVOH-A | PO-A | Simultaneous | Polyolefin to Co-continuous | Very coarse |
| EVOH-A | PO-A | EVOH Premelt | EVOH | Very fine |
| EVOH-B | PO-B | Simultaneous | Polyolefin | Coarse |
| EVOH-B | PO-B | EVOH Premelt | EVOH | Very fine |
| EVOH-A | PO-C | Simulaneous | Polyolefin | Very coarse |
| EVOH-A | PO-C | EVOH Premelt | EVOH | Medium |

EXAMPLE 2

Example 2 followed the methods described in Example 1, with the exception that the ratio of EVOH to polyolefin was 60/40 (i.e., 126 grams of EVOH and 84 grams of polyolefin). Results are given in Table 3.

TABLE 3

| EVOH | POLYOLEFIN | BLEND METHOD | MATRIX | DISPERSION WITHIN MATRIX |
| --- | --- | --- | --- | --- |
| EVOH-A | PO-A | Simultaneous | EVOH | Medium |
| EVOH-A | PO-A | EVOH Premelt | EVOH | Very fine |
| EVOH-B | PO-B | Simultaneous | EVOH | Very coarse |
| EVOH-B | PO-B | EVOH Premelt | EVOH | Very fine |

EXAMPLE 3

Example 3 followed the methods described in Example 1, with the exception that the ratio of EVOH to polyolefin was 40/60 (i.e., 84 grams of EVOH and 126 grams of polyolefin), and a mix temperature of 250° C. is used. Results are given in Table 4.

TABLE 4

| EVOH | POLYOLEFIN | BLEND METHOD | MATRIX | DISPERSION WITHIN MATRIX |
|---|---|---|---|---|
| EVOH-A | PO-A | Simultaneous | PO | Medium |
| EVOH-A | PO-A | EVOH Premelt | EVOH | Very fine |
| EVOH-B | PO-B | Simultaneous | PO | Fine |
| EVOH-B | PO-B | EVOH Premelt | EVOH | Very fine |

EXAMPLE 4

EVOH and polyolefin ware simultaneously fed into the throat of 40 mm twin screw extruder (Werner and Pfleiterer ZSK) having a screw element configuration containing two kneading sections. The mixture was extruded at a melt temperature of 230° C. The molten polymer was underwater pelletized after exiting the extruder die. Pellets of the mixture were then fed into a 1-inch laboratory extruder (Killion ® Extruder) equipped with an 8-inch coat-hanger cast film die to produce thin cast films. Resultant films were inspected and tested for oxygen transmission rate.

An "EVOH premelt" blend was prepared by initially feeding only the EVOH component of the intended mixture into the throat of the twin screw extruder. The polyolefin is then added to the molten EVOH via an inlet port located approximately at mid-length of the extruder. The mixture continued down the length of the extruder to the die, where it was underwater pelletized. Film was produced and tested as described above.

Table 5 gives results for the EVOH/polyolefin blends prepared by these two methods.

TABLE 5

| EVOH | POLYOLEFIN | EVOH/POLYOLEFIN RATIO | BLEND METHOD | CAST FILM PROPERTIES | | |
|---|---|---|---|---|---|---|
| | | | | DRAWDOWN | APPEARANCE | OTR* |
| EVOH-A | PO-A | 55/45 | Simultaneous | Fair | Fair | >10 |
| EVOH-A | PO-A | 55/45 | EVOH Premelt | Very good | Very good | 1.6 |
| EVOH-B | PO-B | 60/40 | Simultaneous | Fair | Fair | >10 |
| EVOH-B | PO-B | 60/40 | EVOH Premelt | Very good | Very good | 2.4 |

*Oxygen Transmission rate(cc/$M^2$-mil-24 hr)
OTR for EVOH-B film made under similar conitions = 1.2

While the invention has been described in terms of certain preferred embodiments, modifications obvious to one with ordinary skill in the art may be made without departing from the scope of the present invention.

Various features of the present invention are set forth in the following claims.

What is claimed is:

1. A process of preparing a two-phase blend of between about 35 wt. % and about 60 wt. % poly(ethylene vinyl alcohol) (EVOH) and between about 40 wt. % and about 65 wt. % graft polyethylene material, said graft polyethylene material comprising polyethylene having grafted thereto between about 0.05 and about 10 wt. percent, based upon the weight of polyethylene, unsaturated carboxylic acid or carboxylic anhydride, the method comprising pre-melting said EVOH and adding said graft polyethylene material in solid form to said pre-melted EVOH, mixing said EVOH and said graft polyethylene material to achieve a melt-blend of said EVOH and said graft polyethylene material and cooling said melt-blend to achieve a solidified blend; whereby a two-phase morphology is achieved in which said EVOH forms a continuous phase having discrete, dispersed domains of graft polyethylene material contained therein, wherein said two-phase blend has improved gas barrier properties relative to a blend of equal proportions formed by co-melting said polyethylene and said EVOH.

2. A process according to claim 1 wherein said polyethylene polymer is high density polyethylene.

3. A process according to claim 1 wherein said polyethylene is low density polyethylene.

4. A method according to claim 1 wherein said EVOH comprises between about 35 and about 55 wt. % and said graft polyethylene material comprises between about 45 and about 65 wt % of said two-phase blend.

5. A two-phase solid blend of poly(ethylene vinyl alcohol) (EVOH) and graft polyethylene material, said graft polyethylene material comprising polyethylene having grafted thereto between about 0.05 and about 10 wt. percent unsaturated carboxylic acid or carboxylic anhydride based upon the weight of said polyethylene, said blend comprising between about 35 and about 55 wt. percent of said EVOH and between about 65 and about 45 wt. percent of said graft polyethylene material; said EVOH forming a continuous phase having discrete, dispersed domains of graft polyethylene material contained therein.

6. A solid blend according to claim 5 in which said polyethylene is high density polyethylene.

7. A solid blend according to claim 5 in which said polyethylene is low density polyethylene.

* * * * *